(12) United States Patent
Georgeson et al.

(10) Patent No.: US 10,649,433 B2
(45) Date of Patent: *May 12, 2020

(54) MODULAR SAFETY MONITORING AND WARNING SYSTEM AND METHODS FOR USE THEREOF

(71) Applicant: The Boeing Company, Chicago, IL (US)

(72) Inventors: Gary E. Georgeson, Tacoma, WA (US); James J. Troy, Issaquah, WA (US); Scott W. Lea, Renton, WA (US); Daniel J. Wright, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/515,410

(22) Filed: Jul. 18, 2019

(65) Prior Publication Data

US 2019/0339659 A1 Nov. 7, 2019

Related U.S. Application Data

(63) Continuation of application No. 15/593,541, filed on May 12, 2017, now Pat. No. 10,409,252.

(51) Int. Cl.
| | | |
|---|---|---|
| *G05B 11/01* | (2006.01) | |
| *G05B 19/048* | (2006.01) | |
| *G05B 9/02* | (2006.01) | |

(52) U.S. Cl.
CPC ............ *G05B 19/048* (2013.01); *G05B 9/02* (2013.01); *G05B 2219/24015* (2013.01); *G05B 2219/49141* (2013.01)

(58) Field of Classification Search
CPC .................. G05B 19/048; G05B 9/02; G05B 2219/49141; G05B 2219/24015
(Continued)

(56) References Cited

U.S. PATENT DOCUMENTS

| 7,194,358 B2 | 3/2007 | Callaghan et al. |
| 2004/0030531 A1 | 2/2004 | Miller et al. |

(Continued)

FOREIGN PATENT DOCUMENTS

| AU | 2010202215 | 12/2011 |
| WO | 2012/129561 | 9/2012 |

OTHER PUBLICATIONS

Extended European Search Report prepared by the European Patent Office in application No. EP 18 16 9840.8 dated Oct. 23, 2018.

*Primary Examiner* — Tanmay K Shah
(74) *Attorney, Agent, or Firm* — McDonnell Boehnen Hulbert & Berghoff LLP

(57) ABSTRACT

Situational-awareness controllers and methods to increase situational-awareness for an actor associated with a triggering event are described. An example method includes in response to receiving a notification of a triggering event generated by at least one sensor, a computing device accessing information that includes related to an actor associated with the triggering event. The computing device correlates the information to a compilation of historical information by (i) determining whether the actor's location is associated with one or more safety events stored as part of the compilation of historical information and (ii) determining a risk level of the actor based on whether the one or more associated safety events occurred within a predetermined range of time from the time associated with the triggering (Continued)

event. The computing device generates a command based on a result of the correlating and sends the command to at least one controllable device.

20 Claims, 10 Drawing Sheets

(58) Field of Classification Search
USPC .......................................................... 700/21
See application file for complete search history.

(56) References Cited

U.S. PATENT DOCUMENTS

| 2009/0177615 | A1 | 7/2009 | Angell et al. |
| 2010/0153353 | A1 | 6/2010 | Angell et al. |
| 2013/0317399 | A1 | 11/2013 | Ribble et al. |
| 2017/0100838 | A1 | 4/2017 | Lewis |

345

Determining the risk level of the actor further based on one or more of a type of the one or more associated safety events, a type of the actor associated with the triggering event and a type of activity the actor associated with the triggering event is engaged in.

Determining the risk level of the actor further based on an action count of an activity for the actor associated with the triggering event

Configuring the command to cause the controllable device to activate an alert indicator, wherein the controllable device is a communication device comprising the alert indicator and configured to be carried, worn or associated with the actor.

FIG. 12

MODULAR SAFETY MONITORING AND WARNING SYSTEM AND METHODS FOR USE THEREOF

CROSS-REFERENCE TO RELATED APPLICATION

This application claims the benefit of the filing date of U.S. Non-Provisional patent application Ser. No. 15/593,541, filed May 12, 2017, and which issued as U.S. Pat. No. 10,409,252 on Sep. 10, 2019, which is hereby incorporated by reference in its entirety.

FIELD

Unless otherwise indicated herein, the materials described in this section are not prior art to the claims in this application and are not admitted to be prior art by inclusion in this section.

The disclosure generally relates to a safety system and, more particularly, to situational-awareness controllers and methods to increase situational-awareness for an actor associated with a triggering event by correlating information to a compilation of historical information from a plurality of actors and determining a risk level of the actor. A command is then generated and sent to a controllable device to cause an alert to be issued or an actuator to activate.

BACKGROUND

One or more actors, such as humans, objects and robots, can move throughout an environment, such as the interior of part or all of a building and/or its surrounding outdoor regions, to perform tasks or otherwise utilize the space. For example, humans, objects and robots can be used together to manufacture complex machinery, such as automobiles, airplanes, machine tools, and even other robots. Other environments may exist where humans, objects and robots can be used together. In manufacturing environments, passive indicators, such as cones, flags or signage, have been employed to alert human actors. Such passive indicators depend upon visual contact from an individual, but when an individual does not perceive the passive indicator the purpose is defeated. Further cut-off switches and proximity sensors have been employed for operator-controlled object actors and automated robot actors, but these are specific to particular applications and are not modular or expandable.

SUMMARY

In an aspect of the disclosure, a method is described that includes, in response to receiving a notification of a triggering event generated by at least one sensor, a computing device accessing information that includes an identification of an actor associated with the triggering event, a location of the actor, and an associated date and a time of the triggering event. The computing device correlates the information to a compilation of historical information from a plurality of actors by (i) determining whether the location of the actor is associated with one or more safety events stored as part of the compilation of historical information and (ii) in response to determining that the location of the actor is associated with one or more safety events, determining a risk level of the actor based on whether the one or more associated safety events occurred within a predetermined range of time from the time associated with the triggering event. The computing device generates a command based on a result of the correlating and sends the command to at least one controllable device.

In an aspect of the disclosure, a situational-awareness controller is disclosed herein. The situational-awareness controller includes a processor and data storage. The processor is in communication with a controllable device and is configured to receive a notification of a triggering event generated by at least one sensor. The data storage stores instructions that, upon execution by the processor, cause the processor to perform situational-awareness functions. The situational-awareness functions include: accessing, via the computing device, information comprising an identification of an actor associated with the triggering event, a location of the actor, and an associated date and a time of the triggering event; correlating the information to a compilation of historical information from a plurality of actors by (i) determining whether the location of the actor is associated with one or more safety events stored as part of the compilation of historical information and (ii) in response to determining that the location of the actor is associated with one or more safety events, determining a risk level of the actor based on whether the one or more associated safety events occurred within a predetermined range of time from the time associated with the triggering event; and generating a command, based on a result of the correlating, and sending the command to at least one controllable device.

In an aspect of the disclosure, an article of manufacture is described. The article of manufacture includes a tangible computer-readable storage medium storing instructions that, upon execution by a processor of the article of manufacture, cause the article of manufacture to perform functions. The functions include: in response to receiving a notification of a triggering event generated by at least one sensor information comprising an identification of an actor associated with the triggering event, a location of the actor, and an associated date and a time of the triggering event; correlating the information to a compilation of historical information from a plurality of actors by (i) determining whether the location of the actor is associated with one or more safety events stored as part of the compilation of historical information and (ii) in response to determining that the location of the actor is associated with one or more safety events, determining a risk level of the actor based on whether the one or more associated safety events occurred within a predetermined range of time from the time associated with the triggering event; and generating a command, based on a result of the correlating, and sending the command to at least one controllable device The features, functions, and advantages that have been discussed can be achieved independently in various examples or may be combined in yet other examples further details of which can be seen with reference to the following description and drawings.

BRIEF DESCRIPTION OF THE DRAWINGS

Examples are described below in conjunction with the appended figures, wherein like reference numerals refer to like elements in the various figures, and wherein:

FIG. 10 shows a flowchart of another example method for use with the method shown in FIG. 7, according to an example implementation;

FIG. 11 shows a flowchart of another example method for use with the method shown in FIG. 7, according to an example implementation;

FIG. 12 shows a flowchart of another example method for use with the method shown in FIG. 7, according to an example implementation;

Corresponding parts are marked with the same reference symbols in all figures.

Figure 1:
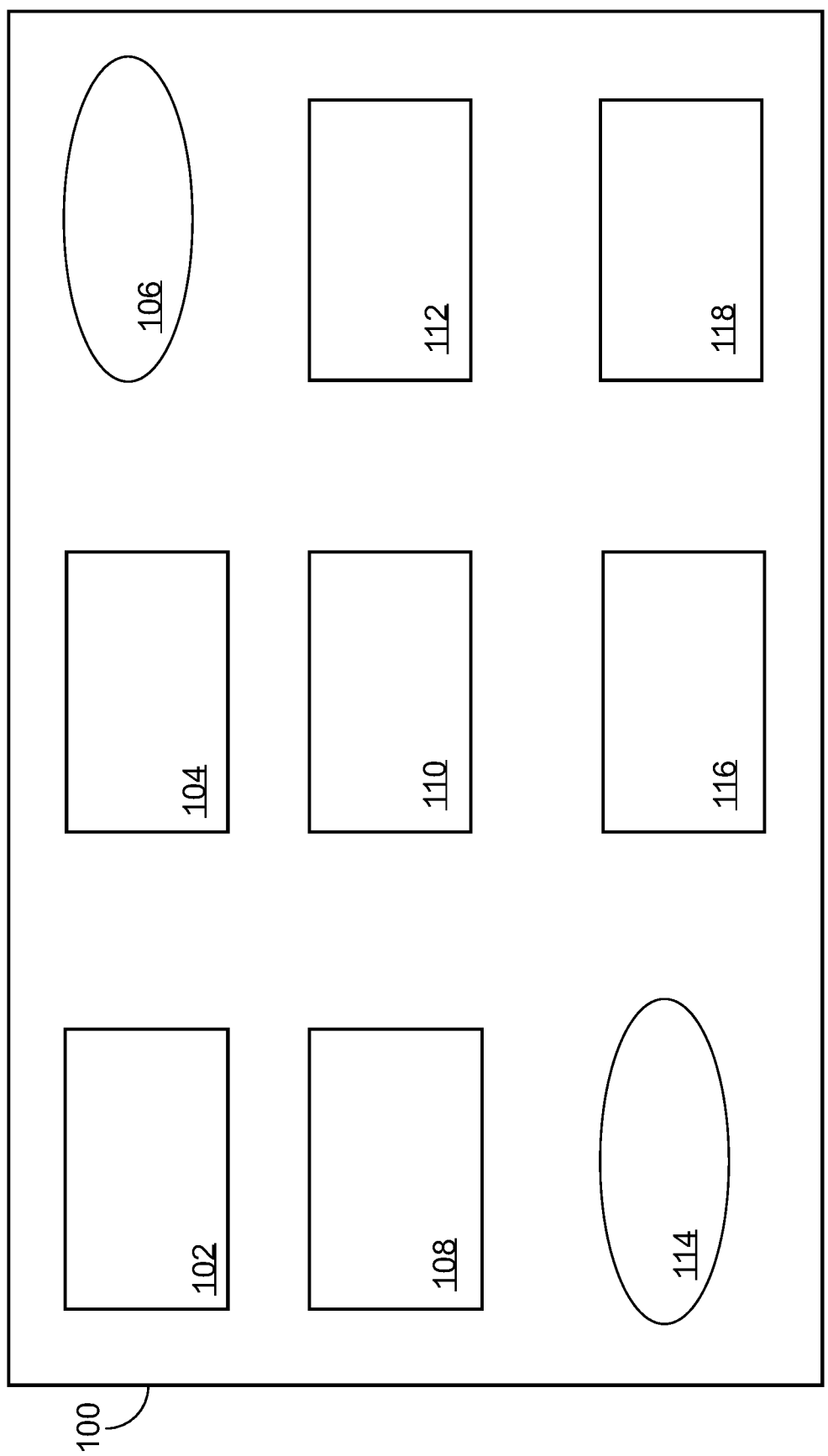
FIG. 1 shows an environment, according to one example implementation.

The drawings are provided for the purpose of illustrating examples, but it is understood that the examples are not limited to the arrangements and instrumentalities shown in the drawings.

DETAILED DESCRIPTION

The disclosed examples provide a situational-awareness controller and methods that can evaluate potential risk in an environment to actors that include humans, objects and robots. For example, in a manufacturing environment, human actors (e.g., engineers, technicians, operators) often work with or encounter object actors (e.g., power tools, forklifts, overhead cranes) and robot actors (e.g., stationary and mobile automated systems). These example situational-awareness controllers and methods allow for increased safety of actors in response to triggering events generated by sensors deployed in the environment or by sensors associated with actors in the environment. These sensors have the advantage of being either statically positioned within the environment, modular to allow reconfigurable sensor placement within the environment or mobile such that a sensor moves with an associated actor. A manufacturing operation optionally involves large equipment and parts used and transported overhead, such as those used in the aerospace industry, and sensors may be arranged in the manufacturing environment to provide situational-awareness of these overhead operations to actors in the environment. In addition, information for an actor associated with a triggering event detected by a sensor is beneficially correlated, via a computing device in the form of a situational-awareness controller, with a compilation of historical information from a plurality of actors in the environment to determine a risk level of the actor. A command is then generated and sent to a controllable device based on the risk level of the actor either to increase situational-awareness for an actor by issuing an alert or to increase safety for an actor by causing a controllable device to enter a safe-mode or cease operation.

Figure 2:
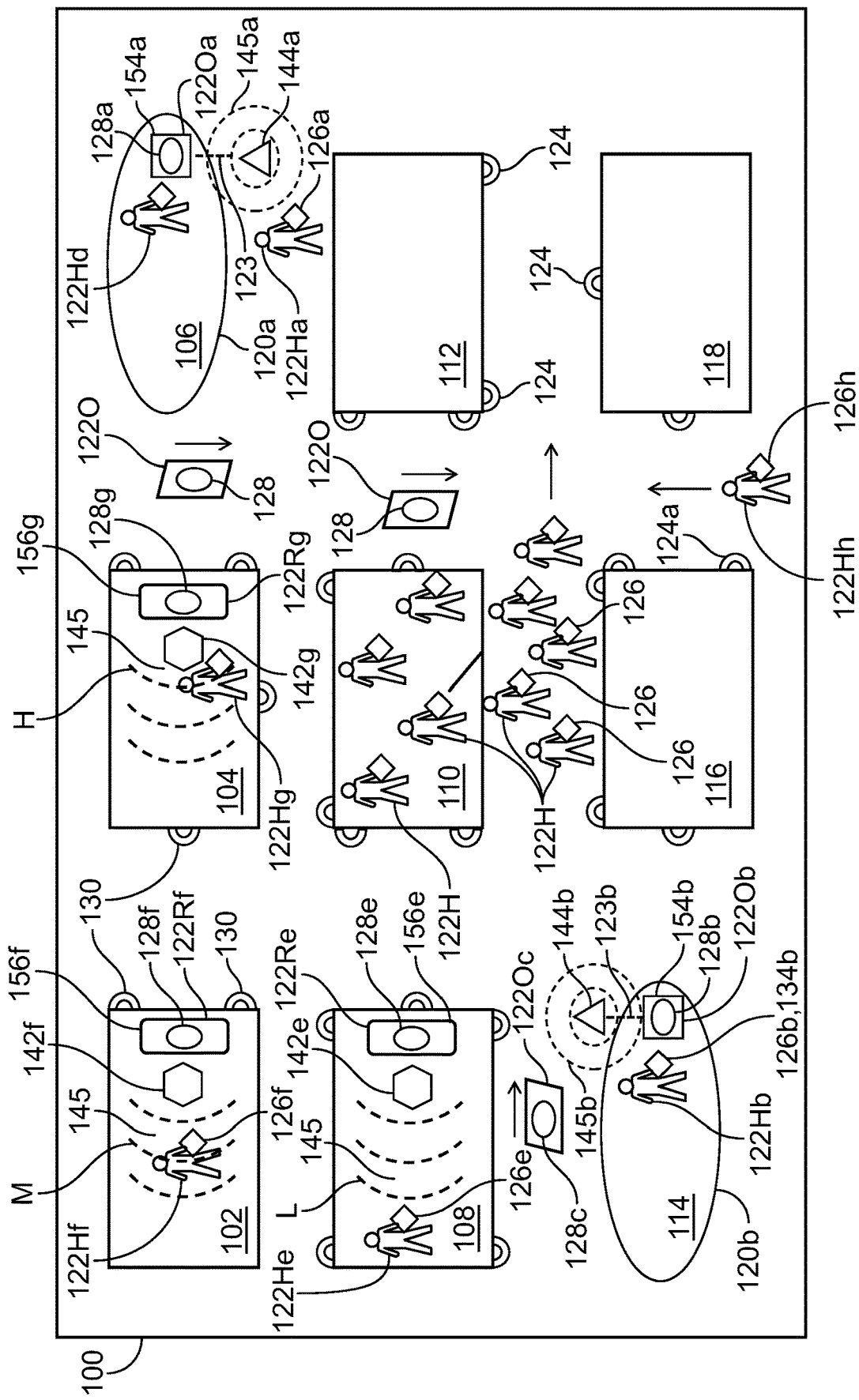
FIG. 2 depicts a series of scenarios that occur in the environment depicted in FIG. 1, according to an example implementation.
Figure 3:
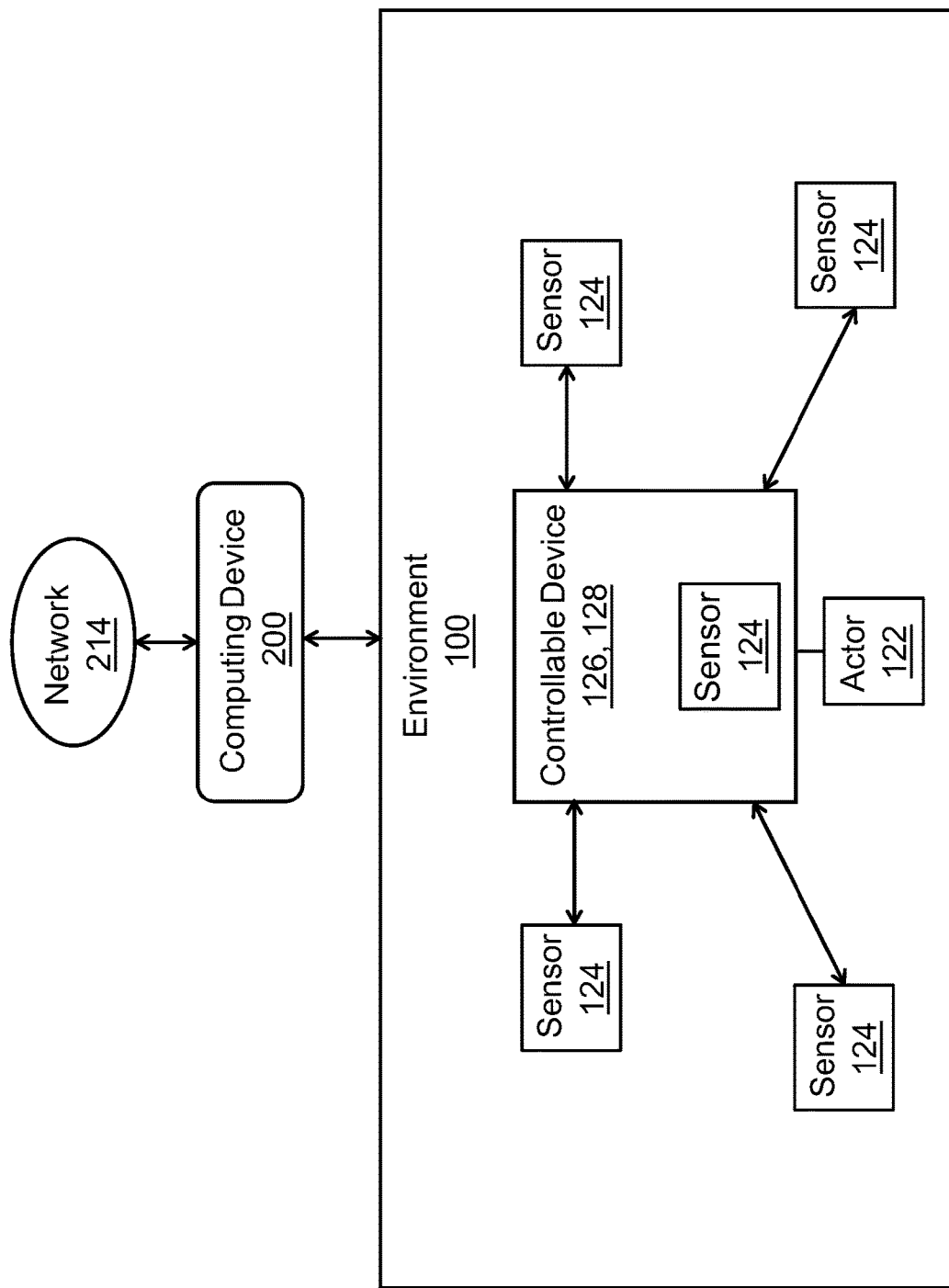
FIG. 3 is a functional block diagram of a system, according to one example implementation.

FIGS. 1 and 2 show an environment 100 which includes nine areas 102, 104, 106, 108, 110, 112, 114, 116, and 118 separated by corridors, in accordance with an example implementation. Environment 100 can represent an indoor space, such as a factory or manufacturing facility, and/or an outdoor space, such as an outdoor region divided into areas. Each area can be utilized by one or more actors 122, including human actors 122H, object actors 122O and robot actors 122R. The object actors 122O and robot actors 122R can be stationary or mobile. Areas 102, 104, 108, 110, 112, 116 and 118 represent areas with self-contained operations, whereas areas 106 and 114 represent areas with blind-side operations that may result in a portion of an object actor 122O (e.g. drill bit or saw blade) or an output (e.g., nail, laser or flame) of the object actor 122O passing through or penetrating one side of a barrier 120 located in areas 106, 114 and entering an adjacent corridor, as discussed in more detail with respect to FIGS. 2 and 5 below. Example barriers 120 include, but are not limited to, an airplane skin or a wing, a ship hull or a vehicle panel in manufacturing or maintenance environments and a wall, a roof or a ceiling in a construction zone. Example barriers 120 may also include a mesh or have a plurality of openings. Other example barriers 120 may include transparent panels that permit visibility but obstruct sound such that a passing actor's auditory perception of an operation may be impaired. In alternative examples, areas 106 and 114 represent open unconfined spaces for reconfigurable operations. In some examples, actor locations associated with areas 106 and 114 and surrounding corridors may be assigned a high risk level in the compilation of historical information due to the nature of the blind-side, sound-obstructed and reconfigurable operations. This risk level may be entered manually into data storage 206 that stores the compilation of historical information or may be correlated by a computing device 200, such as a situational-awareness controller, based on historical information from a plurality of actors at locations associated with areas 106 and 114. The data storage 206 and computing device 200 are described in detail below with respect to FIG. 6.

As shown in FIGS. 2-5, environment 100 can be utilized by actors 122, including human actors 122H, object actors 122O and robot actors 122R to perform tasks, such as but not limited to manufacturing, storing, and/or transporting articles of manufacture (e.g., machinery, electronic components, textiles). At least one computing device in the form of a situational-awareness controller is configured to communicate with one or more controllable devices associated with actors 122 in the environment 100. To maintain safety in environment 100 and perhaps for other reasons, sensors 124 may be deployed throughout environment 100. In some implementations, the sensors 124 are included in controllable devices such as communication devices 126 and response devices 128 that are associated with actors 122 in the environment 100 or a proximity sensor device 144, as described in more detail with respect to FIGS. 3-5 below. In further example implementations, the sensors 124 include sensors 124 that are statically positioned or in fixed locations within the environment 100. And in still further example implementations, the sensors 124 include sensors 124 that are modular such that the sensors 124 are reconfigurable within the environment 100 on an as-needed basis.

Further, sensors 124 may be used alone or in combination within the environment 100 to increase situational-awareness and safety of actors 122 in the environment 100. In addition, the sensors 124 include, or are in communication with a device having, a wireless communication interface to communicate with a computing device 200, such as a situational-awareness controller discussed in more detail below with respect to FIG. 6.

In one example, the sensors 124 are part of a radio-frequency identification ("RFID") system. The RFID sensor has an RFID interrogator 130 that includes an antenna and sends electromagnetic fields to identify and track RFID tags 132 associated with actors 122. The RFID tags 132 have a microchip containing electronically stored information and an antenna. In operation, the RFID interrogator 130 sends out a signal (e.g., electromagnetic waves) and the antenna of the RFID tag 132 is tuned to receive this signal. The microchip then processes the signal and the RFID tag 132 sends a responsive signal back to the RFID interrogator 130 and the RFID interrogator 130 processes the responsive signal. In addition, RFID tags 132 may be passive or active. Passive RFID tags draw power from a nearby RFID interrogator's electromagnetic radio waves. Active RFID tags, on the other hand, have a local power source, such as a battery, and may be interrogated by the RFID interrogator 130 even when the RFID tag 132 is hundreds of meters from the RFID interrogator 130. The RFID interrogator's antenna can be programmed to create an adjustable sensor detection zone depending on the location of a given RFID interrogator 130 in the environment 100. Both passive and active RFID tags could be utilized in the environment 100. When an RFID interrogator 130 reads an RFID tag 132 associated with an actor 122, this constitutes a triggering event associated with the actor 122. For example, as shown in FIG. 2, RFID interrogators 130 are arranged fixed locations throughout the corridors of environment 100. RFID interrogators 130 could also be configured as modular and reconfigurable within the environment 100.

The sensors 124 may also include inertial measurement unit ("IMU") systems 134 associated with an actor 122. IMU systems 134 may be worn by human actors 122H or coupled to a movable component of an object actor 122O or robot actor 122R. IMU systems 134 include acceleration and angular velocity sensors, a microcontroller, an antenna and a power source, like a battery. IMU systems 134 measure linear and angular motion and output integrated quantities of angular velocity and acceleration in the sensor. An IMU system's microchip may be in communication with a processor programmed to track a specific type of activity by an actor 122. The IMU system's microchip may be further programmed to count repetitive actions of an actor 122 to help avoid stress-related injuries, for example. An IMU system's microchip may be configured to perform on-chip analysis of the action count or the functionality may be distributed among more than one physical device in communication with each other, including a controllable device or another computing device 200, such as a situational-awareness controller. Analysis of the IMU system's movement signals may take place in real-time based on a compilation of historical information from a plurality of actors 122 accessible by the IMU system 134. This compilation of historical information may include types of activities associated with repetitive actions and action counts of those repetitive actions associated with safety events (e.g., stress-injuries), an alert threshold and an actuator threshold.

A safety event in the form of a stress injury may be correlated with an action count of 150 repetitive movements. An IMU system's alert threshold in this example may be correlated to an action count of 100 to 120 repetitive movements. The action count correlated with the alert threshold may vary depending on the type of activity and the type of actor performing the activity. When the action count for an alert threshold is exceeded, the situational-awareness controller may generate and send a command to a controllable device to activate an alert indicator 136*a-c*, described below with respect to FIGS. 4-5. In this example, activation of the alert indicator may alert a human actor 122H, such as human actor 122Hb in area 114 associated with IMU system 134*b* and operator-controlled device 154*b* as shown in FIG. 2, to take a break or that the human actor 122H is approaching an ergonomic limit for the shift. In this example, a response device 128*b* corresponding to object actor 122O*b* and human actor 122Hb may issue the alert on a visual display, with an audible alarm or recording or with tactile feedback, for example. In this same example, an IMU system's actuator threshold may be correlated to an action count of 120 to 145 repetitive movements. The action count correlated with the actuator threshold may vary depending on the type of activity and the type of actor performing the activity. If the human actor 122Hb continued the activity after the alert indicator 136*a-c* was activated and caused the action count to increase to a quantity associated with the actuator threshold, the response device 128*b* may receive a command to activate an actuator causing object actor 122Ob to operate in a safe-mode or cease operation thereby forcing the human actor 122Hb to cease the activity or modify the repetitive action. In one example, a triggering event is detected by an IMU system 134 when an action count associated with an activity type reaches a quantity associated with an alert threshold for the activity type.

The sensors 124 may also include a global positioning system ("GPS"). In this example, the GPS includes a GPS receiver 140 associated with an actor 122 in the environment 100. A system of satellites, computers, and receivers is able to determine the latitude and longitude of the GPS receiver 140 by calculating the difference in time for signals from different satellites to reach the GPS receiver 140. The GPS receiver 140 has a GPS processor and antenna that directly receives the data sent by the satellites and computes the location of the GPS receiver 140 in real-time. The GPS receiver 140 associated with the actor 122 is in communication with a GPS processor that has a wireless communication interface configured to access location information from GPS receivers 140 associated with other actors in the environment 100.

The GPS processor is also configured to access a compilation of historical information that includes distances between GPS receivers 140 that are associated with safety events (e.g., human actor-object actor contact or near-miss, human actor-robot actor contact or near-miss and object actor-robot actor contact or near-miss), an alert threshold and an actuator threshold. For example, in one implementation a safety event corresponds to a distance between GPS receivers 140 ranging from 0 to 1 m, an actuator threshold corresponds to a distance between GPS receivers 140 ranging from 1 m to 3 m and an alert threshold corresponds to a distance between GPS receivers 140 ranging from 3 m to 6 m.

The foregoing ranges may vary depending on the type of actor corresponding to each GPS receiver 140. For example, if the GPS receivers 140 are all associated with human actors, then an actuator threshold may not be relevant and an alert threshold corresponds to a distance between GPS receivers 140 ranging from 1 m to 3 m. In another example, where one GPS receiver 140 is associated with a static object actor or a static robot actor and the other GPS receiver 140 is associated with a human actor, then the actuator threshold corresponds to a distance between GPS receivers 140 ranging from 1 m to 2 m and an alert threshold corresponds to a distance between GPS receivers 140 ranging from 2 m to 5 m. In one alternative example, where one GPS receiver 140 is associated with a mobile object actor or a mobile robot actor and the other GPS receiver 140 is associated with a human actor, then the actuator threshold corresponds to a distance between GPS receivers 140 ranging from 1 m to 6 m and an alert threshold corresponds to a distance between GPS receivers 140 ranging from 6 m to 10 m. In one example, a triggering event is detected by a GPS processor when a distance between a first GPS receiver 140 associated with a first actor and a second GPS receiver 140 associated with a second actor reaches a distance associated with an alert threshold.

The sensors 124 may also include proximity sensors 142 that have a sensor zone 145, as shown in FIG. 2. The proximity sensors 142 include, but are not limited to, optical sensors, infrared sensors, ultrasonic sensors, tactile sensors, capacitive sensors, laser-based sensors, through-beam sensors, contact sensors, camera-based sensors and motion sensors. The proximity sensors 142 may detect the presence of an actor 122 in the sensor zone 145. In another example, the proximity sensors 142 are further configured to measure the distance of an actor 122 to the proximity sensor 142. In either case, the proximity sensor's detection of the presence of an actor 122 in the sensor zone 145 constitutes a triggering event associated with the actor 122.

Figure 6:
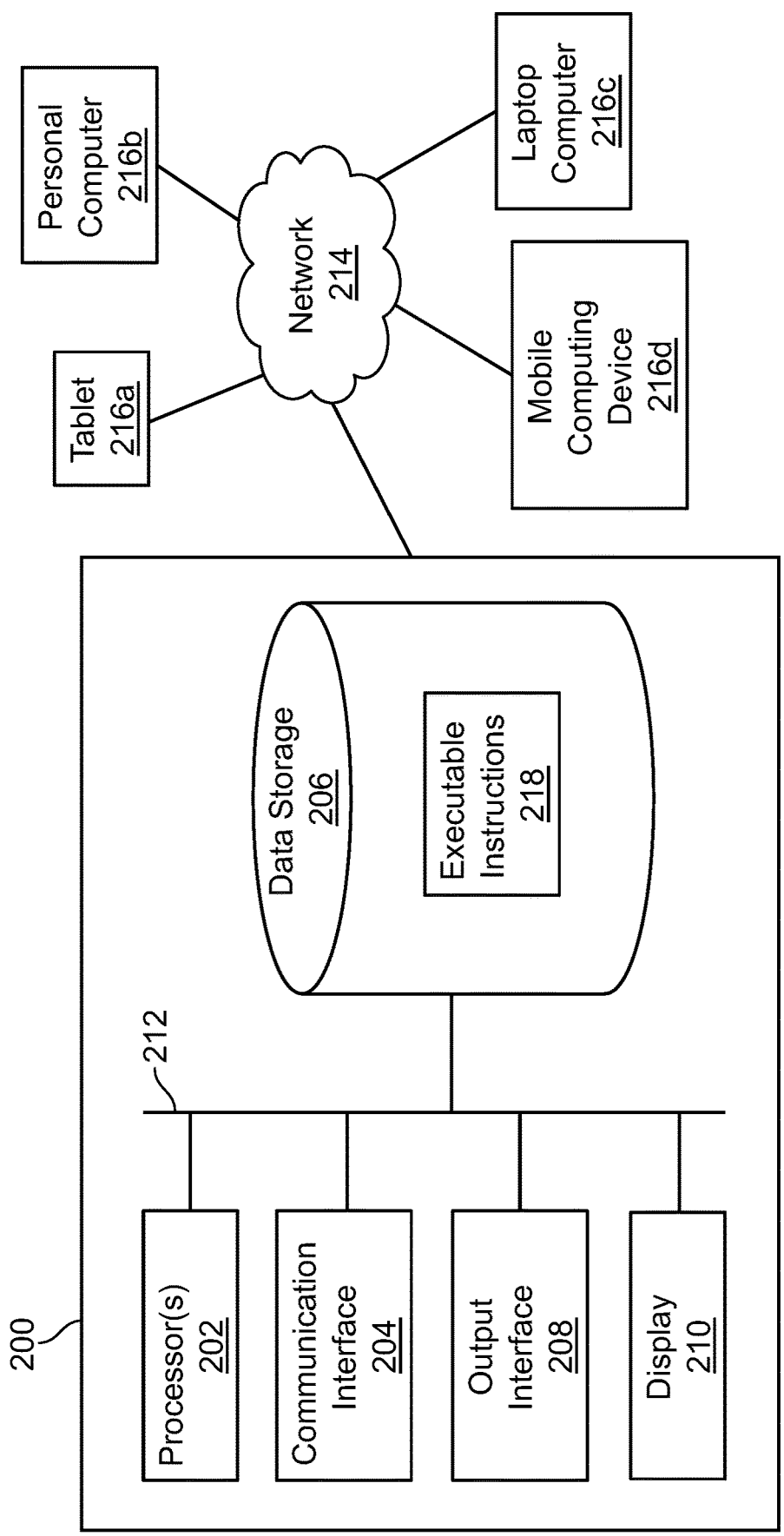
FIG. 6 depicts a block diagram of a computing device and a computer network, according to an example implementation.

With respect to the following discussion of FIG. 2, risk levels of actors 122 in an environment 100, for example, are determined by a computing device 200, discussed with respect to FIG. 6, and the risk levels may range from 1-10, for example. Risk levels assist the computing device in generating commands for at least one controllable device in environment 100. In one example, a range of 1-3 corresponds to a low risk level, a range of 4-7 corresponds to a medium risk level and a range of 8-10 corresponds to a high risk level. Other ranges are possible. A determination of a low risk level of an actor may correspond to a command to activate an alert indicator. A determination of a medium risk level of an actor 122 may correspond to a command to activate an alert indicator 136*a-c* with two or more types of feedback (e.g., visual, audible and/or tactile) or with an escalation in visual effect, volume and/or strength or pulse of vibration and/or to activate an actuator 138 to cause an object actor 122O or a robot actor 122R to operate in a safe-mode. And a determination of a high risk level of an actor 122 may correspond to a command to activate an alert indicator 136*a-c* with two or more types of feedback (e.g., visual, audible and/or tactile) and with an escalation in visual effect, volume and/or strength or pulse of vibration and to activate an actuator 138 to cause an object actor 122O or a robot actor 122R to cease operation. Other combinations and commands are possible and further examples are discussed below.

In one example implementation shown in FIG. 2, proximity sensors 142*e-g* in areas 102, 104 and 108 of environment 100 are disposed adjacent to robot actors 122R*e-g* each having a corresponding response device 128*e-g*. Human actors 122H*e-g* in areas 102, 104 and 108 each have a corresponding communication device 126*e-g*. In this example, sensor zones 145*e-g* each have a low-risk threshold distance L, a medium-risk threshold distance M and a high-risk threshold distance H from the proximity sensors 142*e-g*, respectively. In area 108, human actor 122He is shown outside the low-risk threshold distance L of sensor zone 145*e* for proximity sensor 142*e*. In an example, the risk level of human actor 122He based on human actor 122He's distance from proximity sensor 142*e* is correlated to a low risk level of 1-3, for example, such that a situational-awareness controller may generate a command configured to cause response device 128*e* communicate with robot actor 122Oe to maintain normal operation of robot actor 122Oe. In area 102, human actor 122Hf is shown at a distance from proximity sensor 142*f* that exceeds the high-risk threshold distance H but that is less than the medium-risk threshold distance M. The risk level of human actor 122Hf based on human actor 122Hf's distance from proximity sensor 142*f* is correlated to a medium risk level of 4-7, for example, such that a situational-awareness controller may generate a command configured to cause response device 128*f* to activate an alert indicator and/or to cause robot actor 122Of to operate in a safe-mode. In area 104, human actor 122Hg is shown at a distance from proximity sensor 142*g* that is less than the high-risk threshold distance H. Optionally, the risk level of human actor 122Hg based on human actor 122Hg's distance from proximity sensor 142*g* is correlated to a high risk level of 8-10, for example, such that a situational-awareness controller may generate a command configured to cause response device 128*g* to activate an alert indicator and to cause robot actor 122Og to cease operation.

Figure 4:
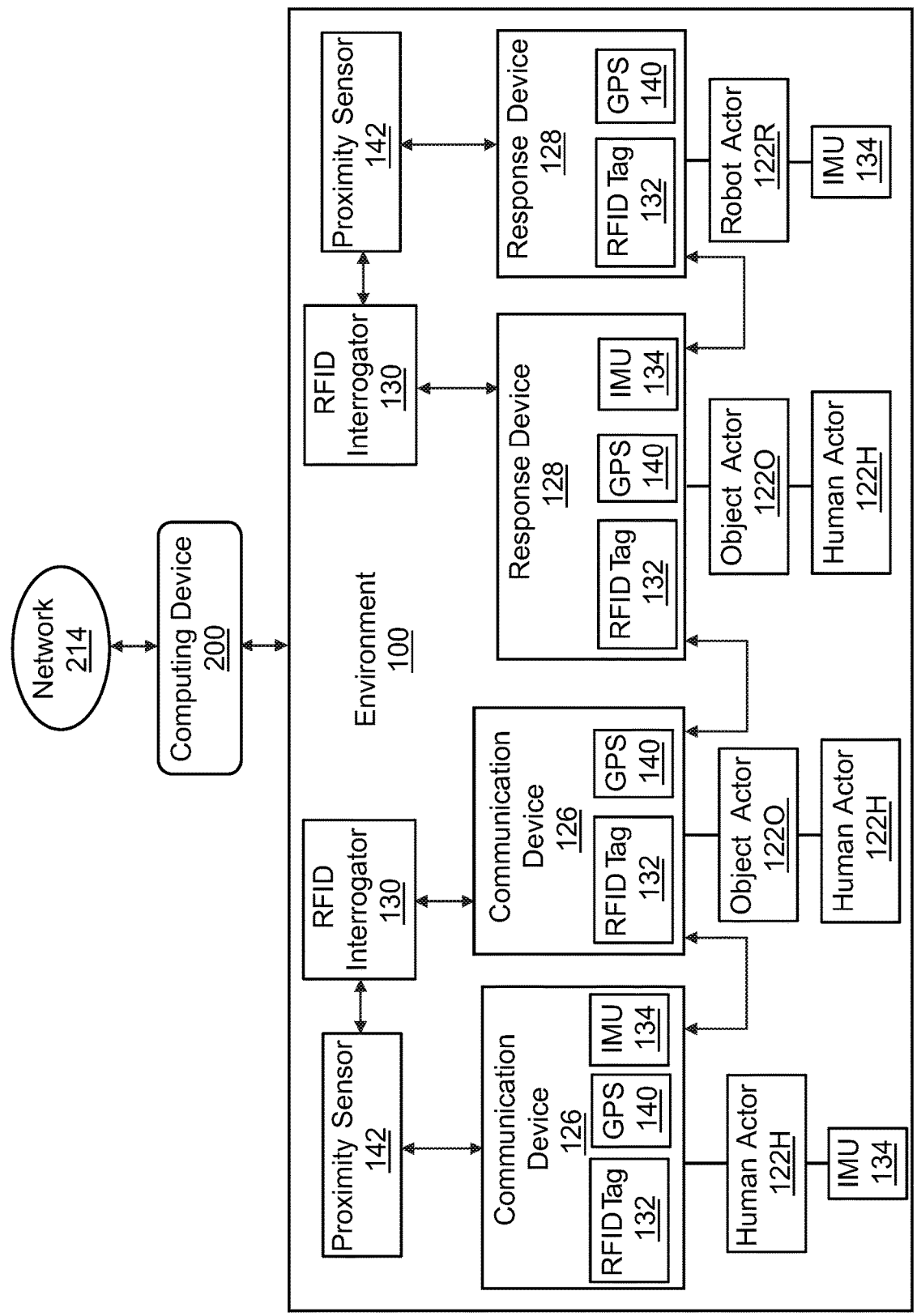
FIG. 4 is a functional block diagram of a system, according to one example implementation.

In a further example, shown in FIG. 4, a proximity sensor 142 can be configured as a proximity sensor device 144 having a transceiver 146*a*, a proximity sensor 142, an alert indicator 136*a* and a computing device 148*a*. In operation, the proximity sensor device 144 is configured to be arranged in a non-line-of-sight position relative to an object actor 122O, in one example, such that the object actor 122O and the proximity sensor device 144 are arranged on opposite sides of a barrier 120 arranged in areas 106, 114, according to one implementation. The proximity sensor 142 is configured for communication with the transceiver 146*a* of the proximity sensor device 144. In one example, the transceiver 146*a* of the proximity sensor device 144 may be part of the proximity sensor 142 and coupled together in a hard-wired, fiber-optic or electro-mechanical arrangement directly or indirectly. In an alternative example, the proximity sensor 142 and the transceiver 146*a* of the proximity sensor device 144 may communicate wirelessly. As used herein, a transceiver 146*a-c* is a device that can both transmit and receive wireless communications, such as a combined radio transmitter and receiver that share common circuitry or a common housing. In an alternate example, both a transmitter and a receiver that have no common circuitry may be used in place of a transceiver 146*a-c*. In one example implementation, the transceiver 146*a-c* is capable of bi-directional wireless communication with at least a computing device 200 configured as a situational-awareness controller that is remotely located relative to the proximity sensor device 144.

The computing device 148*a* of the proximity sensor device 144, described more fully below with respect to the computing device 200 shown in FIG. 6, has one or more processors 202 to receive signals from the proximity sensor 142 and to communicate with a situational-awareness controller to facilitate a determination of a risk level of an actor 122 associated with a triggering event. The computing device 148*a* is communicatively coupled to the proximity sensor 142, the transceiver 146*a* and the alert indicator 136*a*. In one example, the computing device 148*a* is directly wired to components of the proximity sensor device 144, including the transceiver 146a, proximity sensor 142 and the alert indicator 136a. In another example, the computing device 148a is wirelessly connected to the proximity sensor 142, the transceiver 146a and the alert indicator 136a.

In addition, with respect to FIGS. 2-5, some or all of the actors 122 in the environment 100 are each associated with a controllable device. In one example, the controllable device is a communication device 126 having an alert indicator 136b to increase an actor's situational-awareness. Example communication devices 126 include, but are not limited to mobile computing devices, tablets, laptops, wearable smart devices (e.g., watches, rings, glasses, necklaces, badges and head-mounted displays). Example alert indicators 136a-c include, but are not limited to, images on an electronic display, LED lights configured to activate in a manner corresponding to different risk levels, i.e., low-, medium- and high-risk levels, (e.g., color-coded green-yellow-red, lighting up one or more status bars, pulsing LED light at different rates), auditory alerts (e.g., different sounds and/or volumes) and tactile alerts (e.g., different types, degrees and pulses of vibration and combinations thereof). The communication device 126 may be configured by a human actor 122H to include preset alerts. For example, a first human actor 122H may configure the communication device 126 to issue an alert when a second human actor 122H is within a preset distance of the first human actor 122H. A communication device 126 is associated with human actors 122H, with object actors 122O that have human actors 122H as operators or with robot actors 122R that have human actors 122He-g observing the automated systems 156e-g.

The controllable device is a response device 128 having an actuator 138 to cause an operator-controlled device 154, such as an object actor 122O, or an automated system 156, such as a robot actor 122R, to enter a safe-mode or cease operation. Example actuators 138, include, but are not limited to, (i) software code containing instructions executable by computing device 148c to control hardware for an associated object actor 122O or robot actor 122R, (ii) circuit breakers, relays or electrically operated switches that are coupled directly to circuitry for an electric motor or brake system, for example, of an object actor 122O or robot actor 122R or (iii) a pneumatic release valve coupled to one of a pneumatic switch box or in-line with an air hose coupled to an object actor 122O or robot actor 122R. In some examples, the response device 128 may also have an alert indicator 136c for a human actor 122H, such as human actors 122Hb, 122Hd operating an operator-controlled device 154a and 154b, shown for example in areas 106 and 114 of FIG. 2, or human actors 122He, 122Hf, 122Hg observing a robot actor 122Re, 122Rf, 122Rg, shown for example in areas 102, 104 and 108 of FIG. 2. A response device 128 is associated with object actors 122O (e.g., power tools, forklifts, overhead cranes) or robot actors 122R having automated systems that are configured to respond to activation of the actuator 138. Example response devices 128 having an alert indicator 136c include free-standing electronic displays or electronic displays integrated with or mounted on object actors 122O and robot actors 122R.

Figure 5:
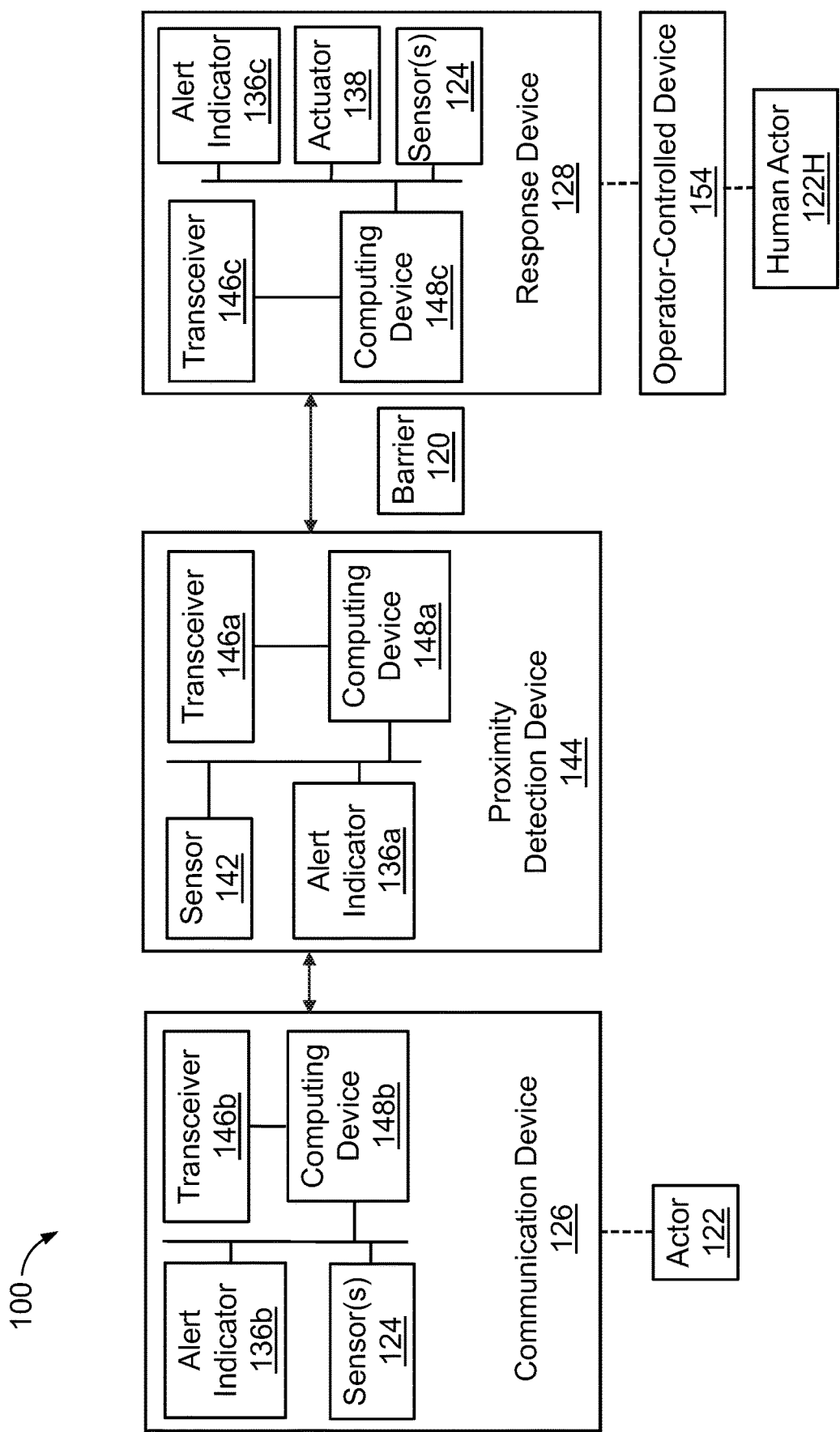
FIG. 5 is a functional block diagram of a system, according to an example implementation.

As shown in FIGS. 2 and 5, the controllable devices each have one or more sensors 124, such as RFID tags 132, proximity sensors 142, GPS receivers 140 and IMU systems 134, as discussed above. The controllable devices also each have transceivers 146a-c and computing devices 148a-c, respectively. As noted, the computing devices 148a-c are described more fully below with reference to FIG. 6. The computing device 148b of the communication device 126 has one or more processors 202 to receive signals to activate the alert indicator 136b, and the computing device 148b is communicatively coupled to the sensors 124, the transceiver 146b and the alert indicator 136b. The computing device 148c of the response device 128 has one or more processors 202 to receive signals to either activate the alert indicator 136c or the actuator 138, and the computing device 148c is communicatively coupled to the sensors 124, the transceiver 146c, the alert indicator 136c and the actuator 138.

In FIGS. 2 and 5, areas 106 and 114 represent areas with blind-side operations that may result in a portion of an object actor 122Oa,b (e.g. drill bit or saw blade) or an output (e.g., nail, laser or flame) of the object actor 122Oa,b passing through or penetrating one side of a barrier 120 and entering a working field of the object actor 122Oa,b in an adjacent corridor. In other words, operational paths 123a,b of object actors 122Oa,b in areas 106, 114 include the route or footprint that a portion of the object actors 122Oa,b and any output of the object actors 122Oa,b follows during operation. As shown in FIG. 2, object actors 122Oa,b in areas 106, 114 are arranged on one side of barriers 120a,b and proximity sensor devices 144a,b are arranged on the opposite side such that the sensor zone 145a,b surrounds the operational paths 123a,b of the object actors 122Oa,b. In this example, proximity sensor devices 144a and 144b are modular and reconfigurable within environment 100. The object actor 122Oa in area 106 is associated with response device 128a. Human actor 122Ha in the corridor between area 106 and area 112 is associated with a communication device 126a. In addition, the object actor 122Ob in area 114 is associated with response device 128b and the object actor 122Oc in the corridor between area 114 and 108 is associated with response device 128c. In one example, the proximity sensor device 144a, communication device 126a and response device 128a are all controllable devices that may be in communication with each other via network 214 and each may receive one or more commands from the situational-awareness controller in response to the same triggering event generated by proximity sensor device 144a detecting the presence of human actor 122Ha. The proximity sensor device 144b and the response devices 128b, 128c are all controllable devices that may be in communication with each other via network 214 and each may receive commands generated and sent from the situational-awareness controller in response to the same triggering event generated by proximity sensor device 144b detecting the presence of object actor 122Oc.

Communication devices 126 and response devices 128 are in communication with a remote computing device, such as computing device 200 discussed below in the context of FIG. 6, that can be configured to perform the herein-described features of a herein-described situational-awareness controller. In alternative example implementations, the computing device 148a of the proximity sensor device 144, the computing device 148b of the communication device 126 and the computing device 148c of the response device 128 may each perform the functions of a situational-awareness controller. Communication between the sensors 124, the controllable devices and the computing device 200 occur via a network 214 discussed below in the context of FIG. 6.

FIG. 2 depicts scenarios that may take place in the environment 100 depicted in FIG. 1, in accordance with example implementations. FIG. 2 illustrates aspects of a system that can integrate a plurality of sensors 124 to increase situational-awareness of actors in the environment 100. As indicated above, the system can include at least one situational-awareness controller, in the form of computing device 200, in wireless (or wired) communication with one or more sensors 124 and one or more controllable devices. The situational-awareness controller can be configured to obtain information from the sensors 124, controllable devices and from other data sources accessible via network 214. For example, the situational-awareness controller may include a processor 202 that is in communication with one or more controllable devices and sensors 124 associated with actors 122, where the processor 202 is configured to receive actor information comprising an identification of an actor 122 associated with a triggering event, a location of the actor 122 in the environment 100 and an associated date and time of the triggering event. In one example, the identification of the actor 122 is optional information that may not be provided to the processor 202.

Actor information identifying human actors 122H may include names, ID numbers or employee numbers. Actor information identifying an object actor 122O or a robot actor 122R may include an identification number, a serial number, an identification string or name of the object actor 122O or robot actor 122R, manufacturer and model information about the object actor 122O or robot actor 122R. Other information about the actors 122 can be used by the computing device 200, as well, including, but not limited to, roles, job classifications or seniority (i.e., novice or experienced) of human actors 122H, information about one or more biological indicators of human actors 122H, and biomechanic information about the human actors 122H, information about capabilities of an object actor 122O or a robot actor 122R, tasks or roles being performed by the object actor 122O or robot actor 122R, and configuration information of the object actor 122O or robot actor 122R (e.g., size, weight, lifting, and/or other capacity information, mobility information, information about actuators of the object or robotic platform).

Actor information is sent to the computing device 200 in response to a triggering event detected by a sensor 124 in environment 100. In addition, in one example implementation, the computing device 200 can poll or otherwise receive information from one or more sensors 124 in the environment 100 on a periodic basis. Such information can include, but is not limited to, the location of actors 122 in the environment 100 from GPS receivers 140 associated with the actors 122 and kinematic information about actors 122. Other data sources can be accessed by or provide information to the computing device 200, such as a data storage 206 containing a compilation of historical information from a plurality of actors 122 in the environment 100. Data storage 206 is described more fully below with respect to FIG. 6.

Data storage 206, and in particular the compilation of historical information of the plurality of actors stored therein, may be supplemented on an ongoing basis based on information received from the sensors 124, the controllable devices and the computing device 200 that pertains to the environment 100 and actors 122 therein. The data storage 206 can be further supplemented based on information that is manually supplied, for example, on an ad hoc basis as safety events occur or as part of a periodic system update via one or more computing devices (e.g., tablet 216a, personal computer 216b, laptop computer 216c or mobile computing device 216d) in wired or wireless communication with the data storage 206 via network 214. For example, the data storage 206 may receive and store, as part of the compilation of historical information, information regarding safety events, including, but not limited to, (i) the type of contact between actors 122 and the type of injury or damage resulting therefrom, (ii) the type of non-contact exposure of an actor 122 to environmental elements affecting safety such as light, lasers, sound, temperature, atmospheric pressure changes, wind, radiation, chemicals or biohazards and the type of injury or damage resulting therefrom, (iii) near-misses between actors 122 (e.g., certain types of actors 122 were within a threshold distance of each other such that injury or damage to one or both actors 122 was imminent, for example) and (iv) confirmation of and type of stress-related injuries to an actor 122 and the associated activities and action counts resulting in the stress-related injuries.

Data storage 206 may also receive and store, as part of the compilation of historical information, locations of new fixed sensors 124 in environment 100 and locations of new static object actors 122O or static robot actors 122R in environment 100 and the actors' associated capabilities. In other example implementations, the data storage 206 may receive and store, as part of the compilation of historical information, information regarding schedules for the environment 100 (e.g., shift changes, lunch breaks, weekly meetings, fire drills, scheduled maintenance, chemical transport between areas 102-118 in the environment 100 etc.) that may be analyzed and correlated to safety events such as increased actor traffic or the presence of hazardous materials at specific locations and times within the environment 100.

After receiving notification of a triggering event generated by at least one sensor 124 in the environment 100 and accessing information for an actor 122 associated with the triggering event, the computing device 200 correlates that actor information to the compilation of historical information from a plurality of actors 122. In an example in which the computing device 200 determines that the location of the actor 122 is associated with one or more safety events stored as part of the compilation of historical information, then the computing device 200 determines a risk level of the actor 122 based on whether the one or more associated safety events occurred within a predetermined range of time from the time associated with the triggering event. In one example, the risk level may range from 1 to 10, with a risk level of 1-3 corresponding to a low-risk scenario, a risk level of 4-7 corresponding to a medium-risk scenario and a risk level of 8-10 corresponding to a high-risk scenario. Optionally, the computing device 200 may further determine the risk level based on additional types of information, including but not limited to, a type of the one or more safety events (e.g., increased actor traffic, human actor-human actor contact, human actor-object actor contact, human actor-robot actor contact, object actor-robot actor contact, robot actor-robot actor contact, object actor-object actor contact, a near-miss between actors, transport of chemical or biohazardous materials, etc.), the type of actor 122 (i.e., human actor 122H, object actor 122O or robot actor 122R) that is associated with the triggering event, the type of activity an actor 122 associated with the triggering event is engaged in, motion information for the actor 122 associated with the triggering event and other actors 122 in the environment 100. One or more software components of the situational-awareness controller may determine the weight afforded to the foregoing information in order to determine the risk level of the actor 122 associated with the triggering event. Each type of information may be ranked in the compilation of historical information according to impact on actor safety, for example, and weighted accordingly in the risk level determination. Further, categories within each type of information may be likewise ranked to further refine the determination of the risk level. Different combinations of these types of information and the categories within each type of information may be used to determine the risk level of the actor 122.

After determining the risk level, the computing device 200 then generates a command based on the result of correlating and sends the command to at least one controllable device. In one example, if the risk level is determined to fall in the range of 1-3, for example, such that the actor is in a low-risk scenario, then the command sent by the computing device 200 (e.g., situational-awareness controller) may be configured to cause a communication device 126 to activate the alert indicator 136*b* and issue an alert corresponding to a low-risk level. For example, the low-risk alert may be in the form of a visual display such as a message on an electronic display, a green-colored LED, illumination of less than a third of a plurality of status bars or stable illumination of an LED. The command may be configured to cause a proximity sensor device 144 to issue an auditory alert corresponding to a low-risk level to a human actor 122H, for example. Alternatively, for a low-risk scenario, the command may be configured to cause a response device 128 to operate an object actor 122O or a robot actor 122R in a low-risk mode that may include, but is not limited to, increased operational speeds and increased range of movement relative to medium- and high-risk modes. Other commands in response to a determination of a low-risk level are possible, including combinations of visual, auditory and tactile alerts.

If the risk level is determined to fall in the range of 4-7, for example, such that the actor is in a medium-risk scenario, then the command may be configured to cause one or more of a communication device 126, a response device 128 or a proximity sensor device 144 to issue an alert via the alert indicators 136*a-c*, corresponding to a medium-risk level. In one example, the medium-risk alert may be in the form of a visual display such as a message on an electronic display, illumination of a yellow-colored LED, illumination of one to two thirds of a plurality of status bars, slow-pulsing illumination of an LED, for example. In addition to or instead of the visual display, the medium-risk alert is an auditory or tactile alert issued by a communication device 126, a response device 128 or a proximity sensor device 144. The command may be configured to cause a response device 128 to operate an object actor 122O or a robot actor 122R in a medium-risk mode that may include, but is not limited to, decreased operational speeds relative to a low-risk mode, decreased range of motion for one or more movable components relative to a low-risk mode, or a changed direction of movement of the object actor 122O or robot actor 122R or one or more components thereof.

If the risk level is determined to fall in the range of 8-10, for example, such that the actor 122 is in a high-risk scenario, then the command may be configured to cause one or more of a communication device 126, a response device 128 or a proximity sensor device 144 to issue an alert via the alert indicators 136*a-c*, corresponding to a high-risk level. The high-risk alert may be in the form of a visual display such as a message on an electronic display, illumination of a red-colored LED, illumination of two thirds or more of a plurality of status bars, or fast-pulsing illumination of an LED, for example. In addition to or instead of the visually displayed alert, the high-risk alert is an auditory alert or a tactile alert or both issued by one or more of a communication device 126, a response device 128 or a proximity sensor device 144. In one example, the auditory alert has a different sound and/or volume for the high-risk alert than for the medium- or low-risk alerts. In another example, the tactile alert has a different type, degree and/or pulse of vibration for the high-risk alert than for the medium- or low-risk alerts. The command may be configured to cause a response device 128 to operate an object actor 122O or a robot actor 122R in a high-risk mode that may include, but is not limited to, decreased operational speeds relative to a medium-risk mode, decreased range of motion for one or more movable components relative to a medium-risk mode, ceased motion of one or more movable components, a changed direction of movement of the object actor 122O or robot actor 122R or one or more components thereof, or ceased operation of the object actor 122O or robot actor 122R. These commands generated based on the determined risk level of an actor 122 may increase an actor's situational-awareness and safety in environment 100.

Commands sent from the situational-awareness controller to the controllable device can be sent to other actors 122 in the environment 100 or to tablet 216*a*, personal computer 216*b*, laptop computer 216*c* or mobile computing device 216*d* in communication with network 214, as well. For example, a computing device 200 can send a command to a robot actor 122R, for example in area 104 shown in FIG. 2, to operate in a high-risk mode and send a command to a communication device 128 worn or carried by a human actor 122H that is also located in area 104 to activate an alert regarding the high-risk mode status of nearby robot actor 122R. Upon receipt of the command, the communication device 126 can change a display, issue an audible or a tactile alert, and/or otherwise indicate that robot actor 122R in area 104 is now in the high-risk mode. Many other examples of commands sent from the computing device 200 to other actors 122 are possible as well. In some example implementations, situational-awareness controllers can send commands so that any computing device capable of receiving the commands can receive and process them. For example, a system-wide notification sent to all computing devices in network 214 may be advantageous in the event of a fire drill or chemical spill, for example.

Once the information has been processed by the situational-awareness controller and appropriate commands generated and sent from the situational-awareness controller to the controllable device, then the situational-awareness controller can obtain additional information about actors 122 and the environment 100, determine risk levels of actors 122 in the environment 100 based on the additional information, and send appropriate commands to the controllable devices associated with those actors 122 or to other computing devices 200, 216*a-d* in the environment 100 or in communication with network 214.

FIG. 6 is a block diagram illustrating an example of the computing device 200, according to an example implementation. The computing device 200 may be used to perform functions of methods shown in FIGS. 7-10. In particular, computing device 200 can be configured to perform one or more functions, including situational-awareness functions, related to herein-described controllable devices associated with actors 122, proximity sensor device 144, sensors 124 and situational-awareness controllers, for example. The computing device 200 has a processor(s) 202, and also a communication interface 204, data storage 206, an output interface 208, and a display 210 each connected to a communication bus 212. The computing device 200 may also include hardware to enable communication within the computing device 200 and between the computing device 200 and other devices (e.g. not shown). The hardware may include transmitters, receivers, and antennas, for example.

The communication interface 204 may be a wireless interface and/or one or more wired interfaces that allow for both short-range communication and long-range communication to one or more networks 214 or to one or more remote computing devices (e.g., a tablet 216a, a personal computer 216b, a laptop computer 216c and a mobile computing device 216d, for example). Such wireless interfaces may provide for communication under one or more wireless communication protocols, such as Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wired interfaces may include Ethernet interface, a Universal Serial Bus (USB) interface, or similar interface to communicate via a wire, a twisted pair of wires, a coaxial cable, an optical link, a fiber-optic link, or other physical connection to a wired network. Thus, the communication interface 204 may be configured to receive input data from one or more devices, and may also be configured to send output data to other devices.

The communication interface 204 may also include a user-input device, such as a keyboard, a keypad, a touch screen, a touch pad, a computer mouse, a track ball and/or other similar devices, for example.

The data storage 206 may include or take the form of one or more computer-readable storage media that can be read or accessed by the processor(s) 202. The computer-readable storage media can include volatile and/or non-volatile storage components, such as optical, magnetic, organic or other memory or disc storage, which can be integrated in whole or in part with the processor(s) 202. The data storage 206 is considered non-transitory computer readable media. In some examples, the data storage 206 can be implemented using a single physical device (e.g., one optical, magnetic, organic or other memory or disc storage unit), while in other examples, the data storage 206 can be implemented using two or more physical devices.

The data storage 206 thus is a non-transitory computer readable storage medium, and executable instructions 218 are stored thereon. The instructions 218 include computer executable code. When the instructions 218 are executed by the processor(s) 202, the processor(s) 202 are caused to perform functions. Such functions include receiving signals from the sensors 124 or controllable devices and determining whether a location of an actor 122 is associated with one or more safety events stored as part of the compilation of historical information and responsively determining a risk level of the actor based on whether the one or more associated safety events occurred within a predetermined range of time from the time associated with the triggering event.

The processor(s) 202 may be a general-purpose processor or a special purpose processor (e.g., digital signal processors, application specific integrated circuits, etc.). The processor(s) 202 may receive inputs from the communication interface 204, and process the inputs to generate outputs that are stored in the data storage 206 and output to the display 210. The processor(s) 202 can be configured to execute the executable instructions 218 (e.g., computer-readable program instructions) that are stored in the data storage 206 and are executable to provide the functionality of the computing device 200 described herein.

The output interface 208 outputs information to the display 210 or to other components as well. Thus, the output interface 208 may be similar to the communication interface 204 and can be a wireless interface (e.g., transmitter) or a wired interface as well. The output interface 208 may send commands to one or more controllable devices, for example The computing device 200 shown in FIG. 6 may also be representative of the computing devices 148a-c, for example.

Figure 7:
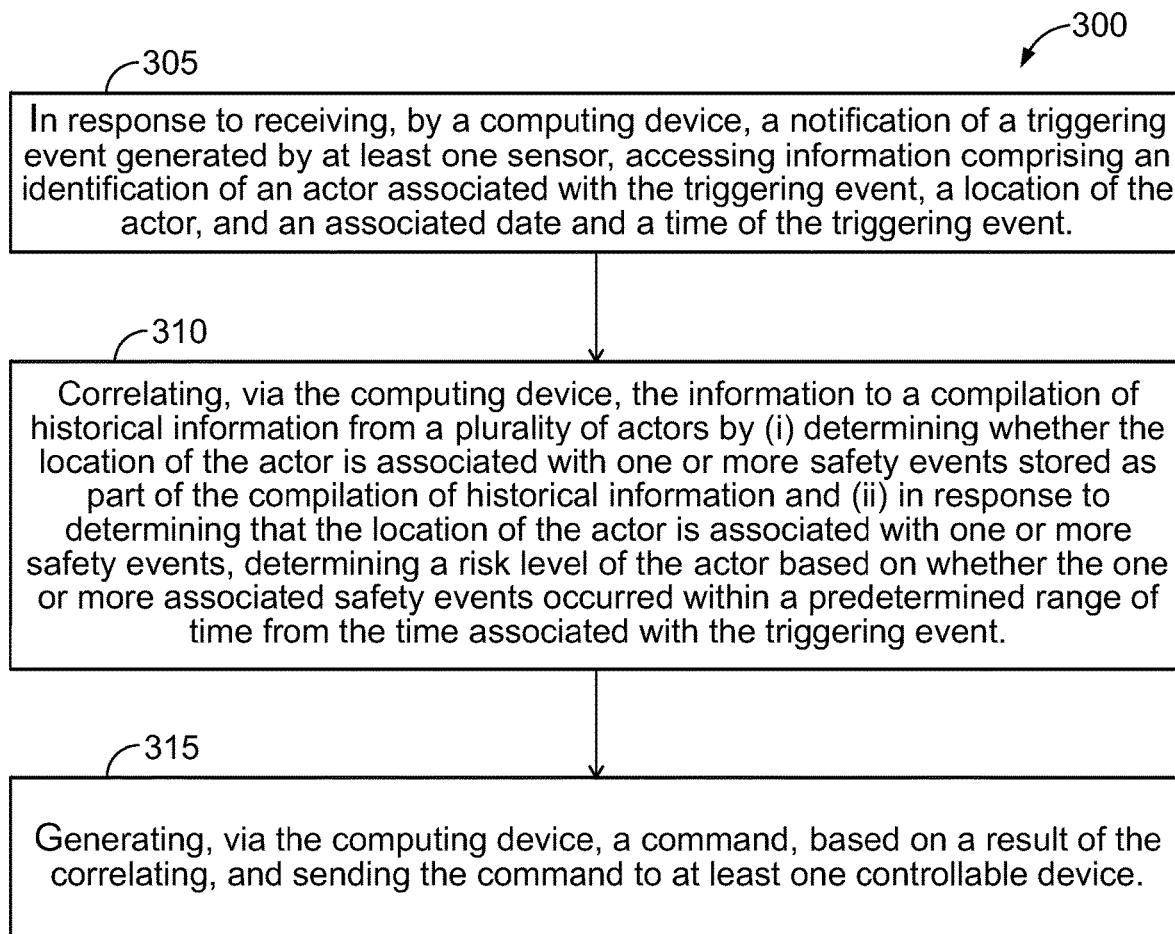
FIG. 7 shows a flowchart of a method, according to an example implementation.

FIG. 7 shows a flowchart of an example method 300 for increasing situational awareness for an actor 122, according to an example implementation. Method 300 shown in FIG. 7 presents an example of a method that could be used with the situational-awareness controller of FIG. 6, for example. Further, devices or systems may be used or configured to perform logical functions presented in FIG. 7. In some instances, components of the devices and/or systems may be configured to perform the functions such that the components are configured and structured with hardware and/or software to enable such performance. Components of the devices and/or systems may be arranged to be adapted to, capable of, or suited for performing the functions, such as when operated in a specific manner. Method 300 may include one or more operations, functions, or actions as illustrated by one or more of blocks 305-345. Although the blocks are illustrated in a sequential order, some of these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of the present examples. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time such as register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 7, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Referring now to FIG. 7, a method 300 is illustrated using the system of FIGS. 1-6. Method 300 includes, at block 305, in response to a computing device 200 receiving a notification of a triggering event generated by at least one sensor 124, the computing device 200 accessing information. The information includes an identification of an actor 122 associated with the triggering event, a location of the actor 122, and an associated date and a time of the triggering event. Example triggering events may include, but are not limited to, detection of the presence of an actor 122 by a proximity sensor 142, proximity sensor device 144, GPS receiver 140 or RFID interrogator 130 or determination by an IMU system 134 associated with an actor 122 that a predetermined action count has been met. Then, at block 310, the computing device 200 correlates the information to a compilation of historical information from a plurality of actors by (i) determining whether the location of the actor 122 is associated with one or more safety events stored as part of the compilation of historical information and (ii) in response to determining that the location of the actor 122 is associated with one or more safety events, determining a risk level of the actor based on whether the one or more associated safety events occurred within a predetermined range of time from the time associated with the triggering event. And, at block 315, the computing device 200 generates a command based on a result of the correlating and sends the command to at least one controllable device.

One example scenario in environment 100 is provided in FIG. 2 showing human actor 122Hh approaching fixed sensor 124a (e.g., RFID interrogator 130 or proximity sensor 142) arranged in the longitudinal corridor between area 116 and area 118. A triggering event occurs once sensor 124a detects human actor 122Hh, and a notification is generated by sensor 124a and sent to the computing device 200 (i.e., situational-awareness controller). In response, the computing device 200 accesses information associated with the human actor 122Hh, as described above, including the location of the human actor 122Hh and the date and time of the triggering event. The computing device 200 correlates this information to a compilation of historical information from a plurality of actors and in this example scenario may determine that the location of the human actor 122Hh is associated with multiple safety events in the form of increased human actor traffic in the lateral cross-corridor between areas 110 and 116 that occurs, for example, within a range of 2 minutes to 5 minutes from the time of the triggering event on the same day of the week. The computing device 200 may determine that the risk level of the human actor 122Hh based on this information corresponds to a medium-risk scenario having a risk level of 4-6. Based on a risk level of 4-6, the computing device 200 may generate and send a command to the communication device 126h configured to cause the communication device 126h to activate an alert indicator and issue visual and tactile alerts. In an alternative example, the multiple safety events from the compilation of historical information are determined to have occurred within 10 minutes to 20 minutes of the triggering event and the computing device 200 may determine the risk level of the human actor 122Hh based on this information corresponds to a low-risk scenario having a risk level of 1-2, for example. Based on a risk level of 1-2, the computing device 200 may generate and send a command to the communication device 126h configured to cause the communication device 126h to activate an alert indicator and issue a visual alert. In addition, the command sent by the computing device 200 may also be configured to cause the communication device 126h to communicate a reason for the alert to the actor 122Hh.

As an alternative, or in addition to the foregoing, the multiple safety events from the compilation of historical information are determined to have occurred within 10 seconds to 1 minute of the triggering event and the computing device 200 may determine the risk level of the human actor 122Hh based on this information corresponds to a high-risk scenario having a risk level of 9-10. Based on a risk level of 9-10, the computing device 200 may generate and send a command to the communication device 126h configured to cause the communication device 126h to activate an alert indicator and issue visual, auditory and tactile alerts. The computing device 200 may also generate and send a second command configured to cause all communication devices 126 and response devices 128 in environment 100 to activate an alert indicator 136b, 136c and display a visual message regarding a location of increased traffic within the environment 100.

Figure 8:
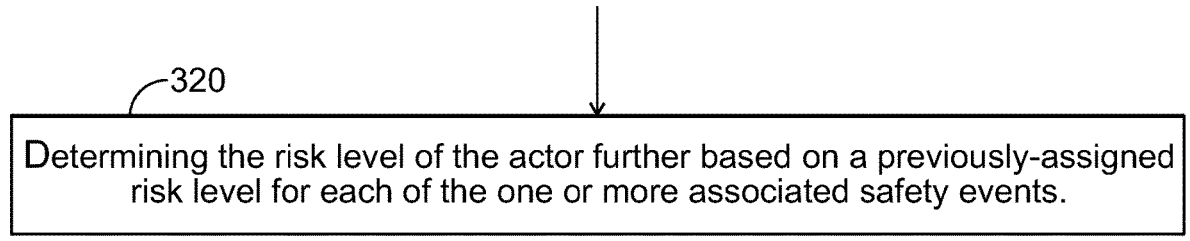
FIG. 8 shows a flowchart of an example method for use with the method shown in FIG. 7, according to an example implementation.

As shown in FIG. 8, at block 320, method 300 includes the computing device 200 determining the risk level of the actor 122 further based on a previously-assigned risk level for each of the one or more associated safety events. The previously-assigned risk level for the associated safety events may be based on safety information that includes (i) the type of contact between actors 122 and the type of injury or damage resulting therefrom, (ii) the type of non-contact exposure of an actor 122 to environmental elements affecting safety such as light, lasers, sound, temperature, atmospheric pressure changes, wind, radiation, chemicals, gases (e.g., high levels of CO or $CO_2$ or low levels of $O_2$), dust, pollen, mold, low or high humidity levels or biohazards and the type of injury or damage resulting therefrom, (iii) the amount of time an actor 122 has been exposed to an environmental element, (iv) near-misses between actors 122 (e.g., certain types of actors 122 were within a threshold distance of each other such that injury or damage to one or both actors 122 was imminent, for example) and (v) confirmation of and type of stress-related injuries to an actor 122 and the associated activities and action counts resulting in the fatigue and stress-related injuries.

Figure 9:
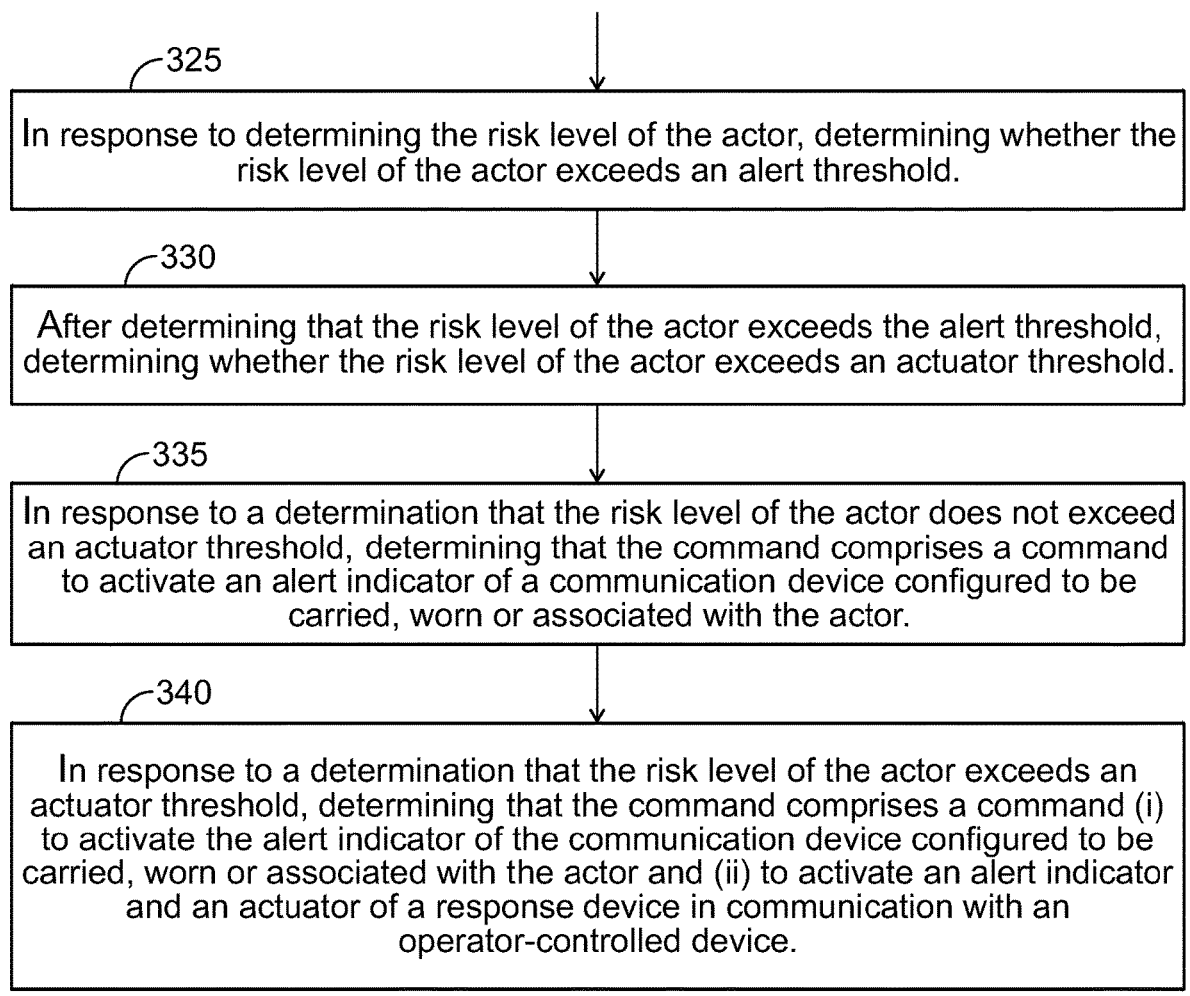
FIG. 9 shows a flowchart of an example method for use with the method shown in FIG. 7, according to an example implementation.

As shown in FIG. 9, optionally method 300 includes, at block 325, in response to determining the risk level of the actor, the computing device 200 determines whether the risk level of the actor 122 exceeds an alert threshold. In one optional example, the risk level of the actor 122 ranges from 1-10, and the alert threshold corresponds to a risk level of 4. At block 330, after determining that the risk level of the actor 122 exceeds the alert threshold, the computing device 200 determines whether the risk level of the actor exceeds an actuator threshold. In an optional example, the risk level of the actor 122 ranges from 1-10, and the actuator threshold corresponds to a risk level of 8. And, at block 335, in response to a determination that the risk level of the actor does not exceed an actuator threshold, the computing device 200 determines that the command comprises a command to activate an alert indicator of a communication device 126 configured to be carried, worn or associated with the actor 122. Next, at block 340, in response to a determination that the risk level of the actor 122 exceeds an actuator threshold, the computing device determines that the command comprises a command (i) to activate the alert indicator of the communication device configured to be carried, worn or associated with the actor and (ii) to activate an alert indicator and an actuator of a response device in communication with an operator-controlled device.

In another optional example, correlating the information to a compilation of historical information from a plurality of actors includes determining that a predetermined number of safety events associated with the location of the actor 122 have occurred within the predetermined range of time from the time of the triggering event over a predetermined number of days. In one optional example, the predetermined number of safety events may range from 10 to 20 events, the predetermined range of time from the time of the triggering event may range from 0 seconds to 5 minutes and the predetermined number of days may range from 30 days to 60 days. Then, in response, a previously-assigned risk level is increased in the compilation of historical information for each of the one or more associated safety events. This is an example of the computing device 200 identifying trends within the compilation of historical information and correlating risk levels in real time or on a periodic basis.

Optionally, as shown in FIG. 10, at block 345, method 300 includes the computing device 200 determining the risk level of the actor 122 further based on one or more of a type of the one or more associated safety events, a type of the actor 122 associated with the triggering event and a type of activity the actor 122 associated with the triggering event is engaged in. Types of safety events may include, but are not limited to, increased actor traffic, human actor-human actor contact, human actor-object actor contact, human actor-robot actor contact, object actor-robot actor contact, robot actor-robot actor contact, object actor-object actor contact, a near-miss between actors, transport of chemical or biohazardous materials, etc. The types of actors 122 include human actors 122H, object actors 122O and robot actors 122R.

In response to determining the risk level of the actor, the computing device determines that the command comprises a command to display the risk level of the actor 122 on an alert indicator 136a-c. Display of the risk level to the actor 122 increases situational-awareness within environment 100.

Correlating the information to a compilation of historical information from a plurality of actors includes, in response to receiving the notification of the triggering event generated by the at least one sensor 124, accessing information to identify any other actors 122 within a predetermined distance of the location of the actor 122 associated with the triggering event. Then, in response to identifying at least one other actor 122 within the predetermined distance of the location of the actor 122 associated with the triggering event, the computing device 200 sending the command to a controllable device corresponding to the actor 122 associated with the triggering event and to a controllable device corresponding to the at least one other actor 122 within the predetermined distance of the location of the actor 122 associated with the triggering event. The technical effect of this operation is to increase situational awareness for actors at or near a location who may not have been detected by a sensor 124 but who may be near a medium- or high-risk activity, for example.

Optionally, correlating the information to a compilation of historical information from a plurality of actors includes, in response to receiving the notification of the triggering event generated by the at least one sensor, accessing information that includes an identification of the at least one sensor and a location of the at least one sensor. Then, the computing device 200 determines whether a distance between the location of the at least one sensor 124 and the location of the actor 122 is less than a high-risk threshold distance H. In one example, the high-risk threshold distance H corresponds to a distance from a sensor to be maintained in order to avoid contact between actors 122 in the environment 100. Next, in response to determining the distance between the location of the at least one sensor 124 and the location of the actor 122 is less than the high-risk threshold distance H, the information associated with the triggering event is assigned as a safety event in the compilation of historical information.

Optionally, correlating the information to a compilation of historical information from a plurality of actors includes, in response to the computing device receiving the notification of the triggering event generated by the at least one sensor, the computing device 200 accesses information that includes an action count of an activity for the actor 122 associated with the triggering event. As discussed above, such an action count can be measured and tracked by an accelerometer or IMU system 134. Then, the computing device 200 determines whether the action count of the activity for the actor associated with the triggering event exceeds a quantity associated with a high-risk threshold. In one example, the quantity associate with the high-risk threshold corresponds to an action count within 10 to 20 actions, for example, of an action count at which stress-related injuries have occurred for the same activity for other actors 122. Then, in response to determining the action count of the activity for the actor associated with the triggering event exceeds the quantity associated the high-risk threshold, the information associated with the triggering event is assigned as a safety event in the compilation of historical information.

Optionally, as shown in FIG. 11, method 300 includes, at block 350, the computing device 200 determines the risk level of the actor further based on an action count of an activity for the actor 122 associated with the triggering event. To make this determination, in one example, the computing device may determine whether the action count has exceeded one or more of the quantities associated with a low-risk threshold, medium-risk threshold and high-risk threshold.

Figure 13:
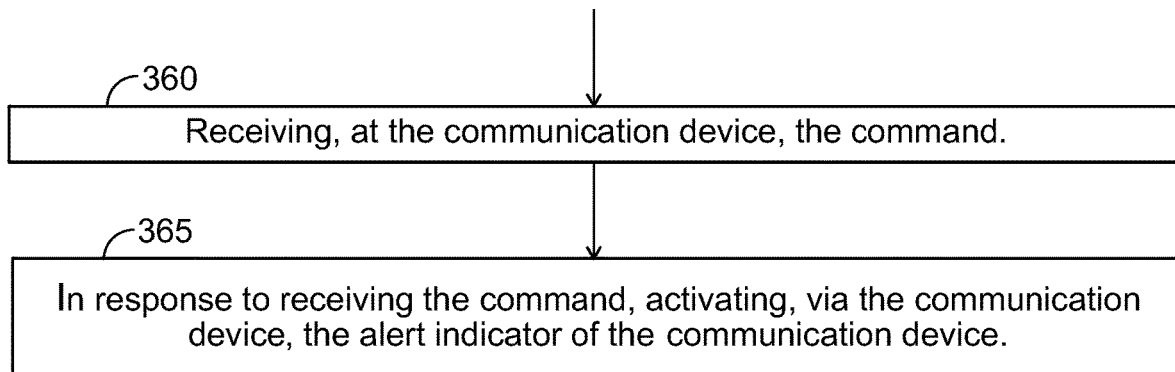
FIG. 13 shows a flowchart of another example method for use with the method shown in FIG. 7, according to an example implementation.

Optionally, as shown in FIG. 12, at block 355, method 300 includes configuring the command to cause the controllable device to activate an alert indicator 136b. In this example, the controllable device is a communication device 126 including the alert indicator 136b and configured to be carried, worn or associated with the actor 122. In a further optional example shown in FIG. 13, method 300 includes at block 360 the communication device 126 receives the command from the computing device and, at block 365, in response to receiving the command, activates the alert indicator 136b of the communication device 126. In one example, the communication device 126 activating the alert indicator 136b includes the alert indicator 136b issuing a visual, an auditory, or a tactile alert.

Figure 14:
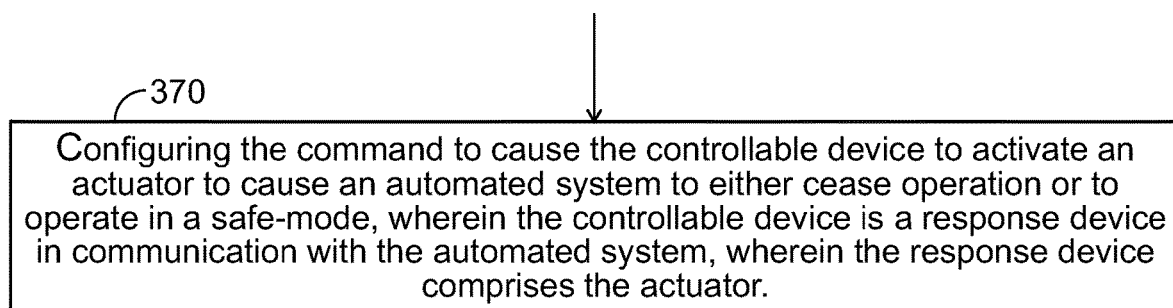
FIG. 14 shows a flowchart of another example method for use with the method shown in FIG. 7, according to an example implementation.

Optionally, as shown in FIG. 14, at block 370, configuring the command to cause the controllable device to activate an actuator 138 to cause an automated system 156 to either cease operation or to operate in a safe-mode, where the controllable device is a response device 128 in communication with the automated system, and the response device 128 comprises the actuator 138.

Figure 15:
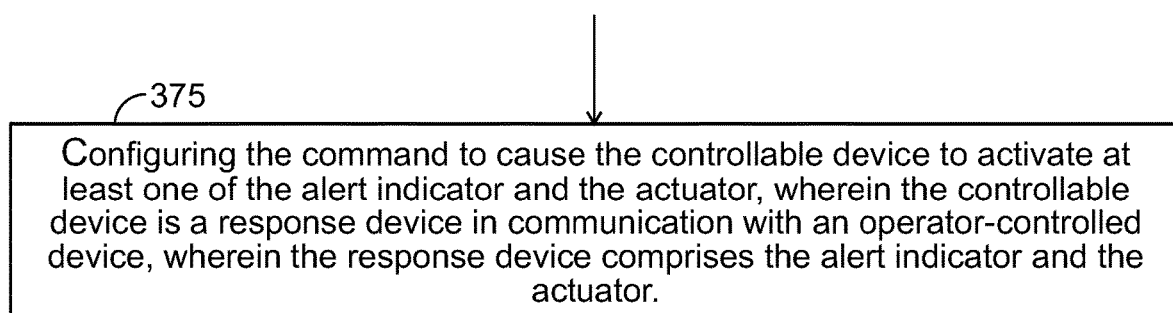
FIG. 15 shows a flowchart of another example method for use with the method shown in FIG. 7, according to an example implementation.

Further, as optionally shown in FIG. 15, at block 375, configuring the command to cause the controllable device to activate at least one of the alert indicator 136b-c and the actuator 138. The controllable device is a response device 128 in communication with an operator-controlled device 154. The response device 128 includes the alert indicator 136b-c and the actuator 138.

The description of different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

We claim:
1. A method, comprising:
in response to receiving, by a computing device, a notification of a triggering event generated by at least one sensor, accessing information comprising an identification of an actor associated with the triggering event, a location of the actor, and an associated date and a time of the triggering event;
correlating, via the computing device, the information to a compilation of historical information from a plurality of actors by (i) determining whether the location of the actor is associated with one or more safety events stored as part of the compilation of historical information and (ii) in response to determining that the location of the actor is associated with one or more safety events, determining a risk level of the actor based on whether the one or more associated safety events occurred within a predetermined range of time from the time associated with the triggering event, wherein correlating the information to the compilation of historical information from the plurality of actors further comprises:
in response to receiving, by the computing device, the notification of the triggering event generated by the at least one sensor, accessing information comprising an identification of the at least one sensor and a location of the at least one sensor;
determining, via the computing device, whether a distance between the location of the at least one sensor and the location of the actor is less than a high-risk threshold distance; and
in response to determining the distance between the location of the at least one sensor and the location of the actor is less than the high-risk threshold distance, assigning the information associated with the triggering event as a safety event in the compilation of historical information; and
generating, via the computing device, a command, based on a result of the correlating, and sending the command to at least one controllable device.

2. The method of claim 1, further comprising:
determining the risk level of the actor further based on a previously-assigned risk level for each of the one or more associated safety events.

3. The method of claim 1, wherein correlating the information to the compilation of historical information from the plurality of actors further comprises:
determining that a predetermined number of safety events associated with the location of the actor have occurred within the predetermined range of time from the time of the triggering event over a predetermined number of days; and
increasing a previously-assigned risk level for each of the one or more associated safety events.

4. The method of claim 1, further comprising:
in response to determining the risk level of the actor, determining whether the risk level of the actor exceeds an alert threshold;
after determining that the risk level of the actor exceeds the alert threshold, determining whether the risk level of the actor exceeds an actuator threshold;
in response to a determination that the risk level of the actor does not exceed an actuator threshold, determining that the command comprises a command to activate an alert indicator of a communication device configured to be carried, worn or associated with the actor; and
in response to a determination that the risk level of the actor exceeds an actuator threshold, determining that the command comprises a command (i) to activate the alert indicator of the communication device configured to be carried, worn or associated with the actor and (ii) to activate an alert indicator and an actuator of a response device in communication with an operator-controlled device.

5. The method of claim 1, further comprising:
determining the risk level of the actor further based on one or more of a type of the one or more associated safety events, a type of the actor associated with the triggering event and a type of activity the actor associated with the triggering event is engaged in.

6. The method of claim 1, further comprising:
in response to determining the risk level of the actor, determining that the command comprises a command to display the risk level of the actor on an alert indicator.

7. The method of claim 1, wherein correlating the information to the compilation of historical information from the plurality of actors further comprises:
in response to receiving, by the computing device, the notification of the triggering event generated by the at least one sensor, accessing information to identify any other actors within a predetermined distance of the location of the actor associated with the triggering event; and
in response to identifying at least one other actor within the predetermined distance of the location of the actor associated with the triggering event, sending the command to a controllable device corresponding to the actor associated with the triggering event and to a controllable device of the at least one other actor within the predetermined distance of the location of the actor associated with the triggering event.

8. The method of claim 1, wherein correlating the information to the compilation of historical information from the plurality of actors further comprises:
in response to receiving, by the computing device, the notification of the triggering event generated by the at least one sensor, accessing information comprising an action count of an activity for the actor associated with the triggering event;
determining, via the computing device, whether the action count of the activity for the actor associated with the triggering event exceeds a quantity associated with a high-risk threshold; and
in response to determining the action count of the activity for the actor associated with the triggering event exceeds the quantity associated the high-risk threshold, assigning the information associated with the triggering event as a safety event in the compilation of historical information.

9. The method of claim 1, further comprising:
determining the risk level of the actor further based on an action count of an activity for the actor associated with the triggering event.

10. The method of claim 1, further comprising:
configuring the command to cause the controllable device to activate an alert indicator, wherein the controllable device is a communication device comprising the alert indicator and configured to be carried, worn or associated with the actor.

11. The method of claim 10, further comprising:
receiving, at the communication device, the command; and
in response to receiving the command, activating, via the communication device, the alert indicator of the communication device.

12. The method of claim 11, wherein activating, via the communication device, the alert indicator comprises issuing a visual, an auditory, or a tactile alert.

13. The method of claim 1, further comprising:
configuring the command to cause the controllable device to activate an actuator to cause an automated system to either cease operation or to operate in a safe-mode, wherein the controllable device is a response device in communication with the automated system, wherein the response device comprises the actuator.

14. The method of claim 1, further comprising:
configuring the command to cause the controllable device to activate at least one of an alert indicator and an actuator, wherein the controllable device is a response device in communication with an operator-controlled device, wherein the response device comprises the alert indicator and the actuator.

15. A situational-awareness controller, comprising:
a processor in communication with a controllable device, the processor configured to receive a notification of a triggering event generated by at least one sensor; and
data storage, storing instructions that, upon execution by the processor, cause the processor to perform situational-awareness functions comprising:
accessing information comprising an identification of an actor associated with the triggering event, a location of the actor, and an associated date and a time of the triggering event;
correlating the information to a compilation of historical information from a plurality of actors by (i) determining whether the location of the actor is associated with one or more safety events stored as part of the compilation of historical information and (ii) in response to determining that the location of the actor is associated with one or more safety events, determining a risk level of the actor based on whether the one or more associated safety events occurred within a predetermined range of time from the time associated with the triggering event, wherein correlating the information to the compilation of historical information from the plurality of actors further comprises:
in response to receiving, by the processor, the notification of the triggering event generated by the at least one sensor, accessing information comprising an identification of the at least one sensor and a location of the at least one sensor;
determining, via the processor, whether a distance between the location of the at least one sensor and the location of the actor is less than a high-risk threshold distance; and
in response to determining the distance between the location of the at least one sensor and the location of the actor is less than the high-risk threshold distance, assigning the information associated with the triggering event as a safety event in the compilation of historical information; and
generating a command, based on a result of the correlating, and sending the command to at least one controllable device.

16. The situational-awareness controller of claim 15, wherein the situational-awareness functions further comprise:
in response to determining the risk level of the actor, determining whether the risk level of the actor exceeds an alert threshold;
after determining that the risk level of the actor exceeds the alert threshold, determining whether the risk level of the actor exceeds an actuator threshold; and
after determining that the risk level of the actor exceeds an actuator threshold, determining that the command comprises a command (i) to activate an alert indicator of a communication device configured to be carried, worn or associated with the actor and (ii) to activate an alert indicator and an actuator of a response device in communication with an operator-controlled device.

17. The situational-awareness controller of claim 15, wherein the situational-awareness functions further comprise:
determining the risk level of the actor further based on a previously-assigned risk level for each of the one or more associated safety events.

18. The situational-awareness controller of claim 15, wherein the situational-awareness functions further comprise:
determining that a predetermined number of safety events associated with the location of the actor have occurred within the predetermined range of time from the time of the triggering event over a predetermined number of days; and
increasing a previously-assigned risk level for each of the one or more associated safety events.

19. The situational-awareness controller of claim 15, wherein the situational-awareness functions further comprise:
determining the risk level of the actor further based on one or more of a type of the one or more associated safety events, a type of the actor associated with the triggering event and a type of activity the actor associated with the triggering event is engaged in.

20. An article of manufacture, comprising a non-transitory computer-readable storage medium storing instructions that, upon execution by a processor of the article of manufacture, cause the article of manufacture to perform functions comprising:
in response to receiving, by the article of manufacture, a notification of a triggering event generated by at least one sensor, accessing, via the article of manufacture, information comprising an identification of an actor associated with the triggering event, a location of the actor, and an associated date and a time of the triggering event;
correlating, via the article of manufacture, the information to a compilation of historical information from a plurality of actors by (i) determining whether the location of the actor is associated with one or more safety events stored as part of the compilation of historical information and (ii) in response to determining that the location of the actor is associated with one or more safety events, determining a risk level of the actor based on whether the one or more associated safety events occurred within a predetermined range of time from the time associated with the triggering event, wherein correlating the information to the compilation of historical information from the plurality of actors further comprises:

in response to receiving, by the processor, the notification of the triggering event generated by the at least one sensor, accessing information comprising an identification of the at least one sensor and a location of the at least one sensor;

determining, via the processor, whether a distance between the location of the at least one sensor and the location of the actor is less than a high-risk threshold distance; and in response to determining the distance between the location of the at least one sensor and the location of the actor is less than the high-risk threshold distance, assigning the information associated with the triggering event as a safety event in the compilation of historical information; and generating, via the article of manufacture, a command, based on a result of the correlating, and sending the command to at least one controllable device.

\* \* \* \* \*